United States Patent [19]

Moree et al.

[11] 4,394,799
[45] Jul. 26, 1983

[54] CONDUIT BENDING PLANE INDICATOR

[76] Inventors: Elwood D. Moree, Rte. 1, Vienna, Ga. 31092; Dennis C. Snowden, 740M Muckalee Creek Rd., Leesburg, Ga. 31763

[21] Appl. No.: 298,205

[22] Filed: Aug. 31, 1981

[51] Int. Cl.³ .............................................. G01C 9/00
[52] U.S. Cl. ...................................... 33/343; 33/351; 33/371
[58] Field of Search ................. 33/1 N, 333, 343, 351, 33/353, 370, 371, 372, 373, 391, 398

[56] References Cited

U.S. PATENT DOCUMENTS

| 964,066 | 7/1910 | Sprenkle | 33/351 |
| 1,377,720 | 5/1921 | Neff | 33/391 |
| 2,022,452 | 11/1935 | Aegerter | 33/351 |
| 2,079,070 | 5/1937 | Johnston | 33/371 |
| 2,535,791 | 12/1950 | Fluke | 33/351 |
| 2,601,643 | 6/1952 | Sulger | 33/391 |
| 2,624,954 | 1/1953 | Watkins | 33/370 |
| 2,824,381 | 2/1958 | Traupmann | 33/371 |
| 3,060,587 | 10/1962 | Picken | 33/343 |
| 3,707,772 | 1/1973 | Cotter | 33/373 |
| 4,274,208 | 6/1981 | Yakkel | 33/371 |

FOREIGN PATENT DOCUMENTS 607443 12/1934 Fed. Rep. of Germany ........ 33/371

Primary Examiner—Richard R. Stearns
Attorney, Agent, or Firm—Jones & Askew

[57] ABSTRACT

A conduit bending plane indicator comprising a base, a clamp for affixing the indicator to conduit to be bent, bubble level indicators to provide an indication that a bend in the conduit is coplanar with reference planes, and an angle indicator to provide an indication of the angle of bend of the conduit. The bubble levels are mounted at opposite ends of the base member orthogonally oriented to one another to insure level placement of the conduit in a conduit bending device. The angle indicator is pivotable and attachable to either side of the apparatus to facilitate ease of reading.

9 Claims, 9 Drawing Figures

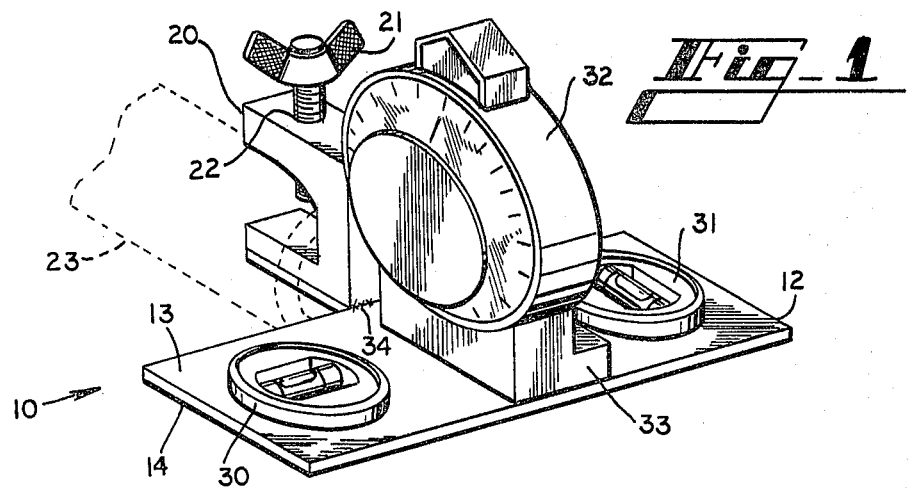
Fig_1
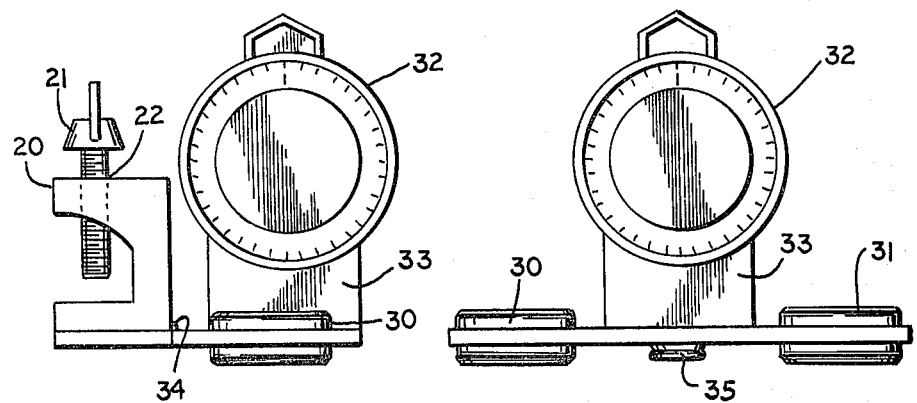
Fig_2  Fig_3
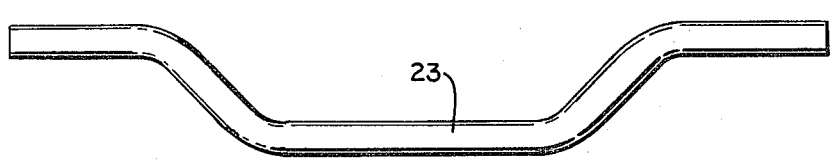
Fig_5  Fig_6
Fig_4

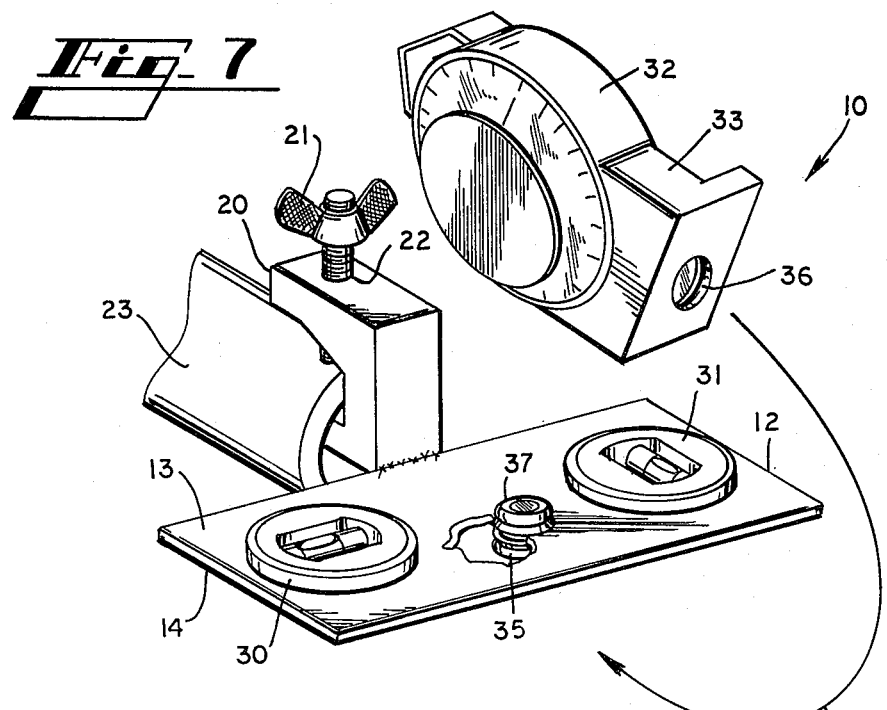
Fig. 7
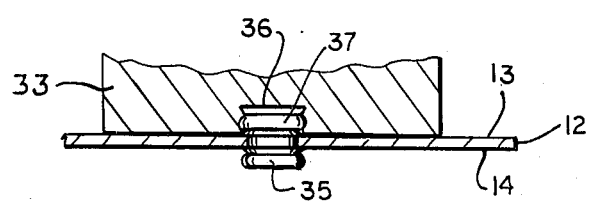
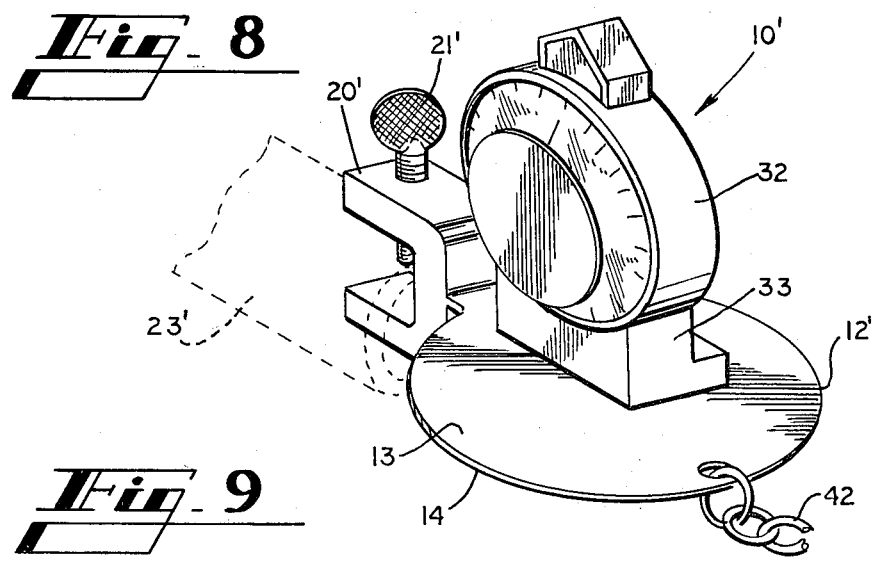
Fig. 8
Fig. 9

CONDUIT BENDING PLANE INDICATOR

BACKGROUND

1. Field of the Invention

The present invention relates in general to conduit bending, and specifically relates to an apparatus which is attached to a section of conduit to be bent by a conventional conduit bending tool to provide a visual indication that a bend is remaining within a referenced plane and is not being skewed or forming a dog-leg.

2. Description of the Prior Art

In the building trades, there is frequently a need for bent tubing or conduit to carry utilities such as electrical wiring along the contours and shapes of a building. Multiple bends of a single section of conduit are frequently required to avoid a particular obstacle. A generally U-shaped or "saddle" bend is commonly made in the conduit to avoid obstacles impeding a straight run of conduit. It is clearly more advantageous to bend the conduit at the construction site, so that bends of various angles to fit the particular installation or application may be made with greater flexibility in surmounting unforseen obstacles.

Conventional bending machines exist which may be used to form such bends with great angular and planar precision, but many of these machines are very large and impracticable for use at a construction site. Other types of conventional bending devices have been devised which are much simpler and smaller than the heavy-duty machines and which may easily be transported about a construction site so that bending of tubes may be done on-site, but these smaller machines often produce inferior bends if not used skillfully.

The tube bending apparatus disclosed in Gardner, U.S. Pat. No. 3,465,560, is a relatively large and immobile machine which provides superior bends because it prevents re-positioning of the conduit partway through a bending operation. Those skilled in the art will recognize that repositioning a conduit partway through a bending operation greatly increases the chance of displacement of the bending plane midway through the bend. The result of displacement of the bending plane is a twisted bend section or a "dog-leg", which renders the tube useless.

The patent to Miller, U.S. Pat. No. 3,396,565 discloses a tubing bending apparatus which is relatively portable but provides no means for preventing dog-legs. A clinometer is frictionally attached to the conduit by means of a releasable clamp and provides an indication as to the degree of bend of a conduit in the machine. However, the clinometer is only suitable for indicating the degree of bend and provides no indication of whether a dog-leg exists in a particular section of pipe in the machine. The Miller apparatus appears to prevent dog-legs by moving the conduit intermittently through the bending device with a feeding mechanism which advances the conduit in step-by-step increments. A pair of clamps alternatively grip and advance the pipe through the apparatus thereby preventing displacement of the bending plane. The Miller apparatus, however, is large, bulky, and expensive due to the intricate clamping mechanism and hydraulics.

Other means have been proposed for improving conventional on-site tube bending devices by including an angle indicating means. U.S. Pat. No. 2,932,225 to Gardner discloses a bending indicator provided with spirit levels which may be attached to the bending apparatus, thereby enabling the workman to determine the degree of bend without the use of other instruments. Since the Gardner device is attached to the body of the bending apparatus, rather than to the conduit, the apparatus does not provide an indication with respect to the bending plane of the conduit and is useful only for providing an indication of the degree of bend of the apparatus.

SUMMARY OF THE INVENTION

The present invention provides an indicating apparatus for ensuring coplanar bends in conduit bent by a small, portable conduit bending machine. The apparatus comprises a base, means for fastening the base to a section of conduit to be bent, a plane indicator which provides an indication that a bend in the conduit is planar in a first plane and in a second plane, and an angle indicator which provides an indication of the degree of bend of the conduit.

The invention is attached to the end of a section of conduit prior to the insertion of the section into a conventional conduit bending device. Upon insertion in the conduit bending device, the conduit is rotated until the spirit bubble level is level. As the conduit is bent, the operator observes the spirit bubble level and ensures that the bend remains coplanar with the reference plane established when the conduit was inserted in the bending device.

A preferred embodiment of the present invention includes a C-clamp for attachment of the apparatus to the conduit, two spirit bubble levels which provide an indication of the plane of bend in two orthogonal planes, and a rotatable, detachable angle indicator which may conveniently be attached to either side of the apparatus to ensure easy readability by the operator.

Therefore, it is an object of the present invention to provide an improved conduit bending plane indicator which provides an indication that a bend being made in a section of conduit coplanar with a desired plane of bending.

It is another object of the present invention to provide a conduit bending plane indicator which includes an angle indicator to provide an indication of the degree of bend of the conduit.

It is another object of the present invention to provide a conduit bending plane indicator having a rotatable, detachable angle indicator which may advantageously be removed from one side of the apparatus and replaced on the other side of the apparatus, thereby assuring easy and convenient readability of the indicator.

It is another object of the present invention to provide a conduit bending plane indicator having a rotatable angle indicator attached thereto which may be pivoted for easy and convenient viewing by the operator of a conduit bending device.

It is another object of the present invention to provide a conduit bending plane indicator having plane indicating means attached to the indicator which is easily and conveniently viewable by the operator of a conduit bending device.

These and other objects and advantages of the present invention will be more apparent by reference to the following description of a preferred embodiment of the present invention and by reference to the attached drawings.

BRIEF DESCRIPTION OF THE DRAWINGS

FIG. 1 is a perspective pictorial view of a preferred embodiment of the present invention, shown attached to the end of a section of conduit.

FIG. 2 is a side view of the preferred embodiment shown in FIG. 1.

FIG. 3 is a front view of the preferred embodiment of FIG. 1, showing the angle indicator rotated 90 degrees.

FIG. 4 shows a U-shaped section of pipe commonly called a "saddle" bend, the forming of which may be advantageously assisted by using the present invention.

FIG. 5 is an end view of the pipe of FIG. 4, showing a coplanar bend.

FIG. 6 is an end view of the pipe shown in FIG. 4, showing a non-coplanar bend having a dog-leg.

FIG. 7 is a perspective and partly broken-away pictorial view of the apparatus of FIG. 1, showing how the angle indicator may be detached and placed on the other side of the base.

FIG. 8 is a partial sectional view of the base member and mounting member of the preferred embodiment.

FIG. 9 is a perspective view showing another embodiment of the present invention.

DETAILED DESCRIPTION OF THE PREFERRED EMBODIMENT

Referring now to the drawings, in which like numerals indicate like parts throughout the several drawings, FIG. 1 shows a preferred embodiment of a conduit bending plane indicator 10 constructed in accordance with the present invention. The apparatus comprises a base member 12 having an upper side 13 and a lower side 14. Base member 12 is preferably fabricated from a material such as steel, aluminum, or the like so as to impart rigidity to the apparatus.

A C-clamp 20 is affixed to the midpoint of the base member 12 and is oriented so that the legs of the clamp are extending outwardly from the base member parallel with the surface of the base member. The clamp 20 is attached to the base member 12 by a weld 34 or the like. A wing bolt 21 is threaded through a tapped hole 22 in the clamp 20. Clamp 20 should be narrow enough to allow the clamp to be affixed to a large variety of conduit diameters, but wide enough to allow the threading of hole 22 without impairing the structural integrity of the clamp. A clamp having a width of between about ¼ inches and ¾ inch will perform acceptably in the disclosed embodiment of the present invention. The C-clamp 20 in FIG. 1 is shown affixed to a section of conduit 23 so that the clamp and attached base member 12 are relatively rigid and immobile with respect to the conduit.

A spirit bubble level 30 is affixed to one end of the base member 12 so that it is viewable from both the upper side 13 and lower side 14 of the base member. Bubble level 30 is oriented parallel to the length of the base member and thus provides an indication whether the length of the base member is level. A similar spirit bubble level 31 is affixed to the end of the base member 12 opposite bubble level 30 and is oriented orthogonally to bubble level 30. Bubble level 31 is also visible from both the upper side 13 and lower side 14 of the base member. Bubble level 31 provides an indication whether the width of the base member is level in a plane orthogonal to the length of the base member.

An angle indicator 32 is detachably attached to the upper side 13 of the base member. The angle indicator may comprise a conventional pendulum clinometer. In FIG. 1, the angle indicator is shown so that the angle indicated is the angle of the bend of the pipe with respect to the plane indicated by bubble level 31. It will be appreciated that when the conduit is level as indicated by bubble level 31, the angle of bend indicated by angle indicator 31 is 0 degrees.

Angle indicator 32 is attached to base member 12 with rotatable detachment means so that the indicator may be pivoted 360 degrees without obscuring or obstructing bubble levels 30 or 31. A bracket or mounting member 33 having snap means (shown more clearly in FIG. 7) supports angle indicator 32 on the base member. The mounting member preferably has a width in contact with the base member which is approximately the same width as the angle indicator which ensures that the angle indicator is steadily affixed to the base member and does not rock from side to side. The snap means, which allows both detachment and rotation of the angle indicator, is described in connection with FIG. 7.

FIG. 2 is a side view of the preferred embodiment shown in FIG. 1. In FIG. 2, clamp 20 may be seen attached to base member 12 by a weld 34. Other means for attaching clamp 20 to the base member will occur to those skilled in the art.

FIG. 3 is a front view of the preferred embodiment of the present invention shown in FIG. 1. The angle indicator 32 is shown pivoted 90 degrees from the position of the angle indicator shown in FIG. 2. Also evident in FIG. 3 is a male snap member 35, mounted on the lower side 14 of the base, which is used for alternatively attaching mounting member 33 and angle indicator 32 to the lower side of the base. The mating female snap member 36 (seen in FIG. 7) is imbedded flush with the bottom of mounting member 33. Consequently, it will be understood that angle indicator 32 may be removed from the top side 13 of base member 12 by unsnapping the female snap member 36 from the second male snap member 37 mounted on the top side of the base member, and affixed to the male snap member 35 on the lower side 14 of the base member, and may be pivoted to suit the convenience of the operator when placed on either the upper side or the lower side.

Those skilled in the art will appreciate that other means for detachably and rotatably attaching angle indicator 32 and mounting member 33 to base member 12 may be successfully employed in the present invention. For example, a magnet may be affixed to mounted member 33 flush with the base thereof. The use of such alternative mounting means for attaching angle indicator 32 to base member 12 while still allowing rotation, removal, and replacement on the opposite side is within the scope of the present invention.

In order to use the present invention, the operator of a conventional conduit bending device clamps the conduit bending plane indicator with C-clamp 20 to the end of a conduit to be bent, such as the conduit shown at 23 in FIG. 1. Wing bolt 21 is tightened against the conduit so that the plane indicator is snugly and immovably affixed to the conduit. The conduit is then placed in the conduit bending device. Prior to bending, the conduit is rotated about its axis until the bubble level 30 indicates that the length of base member 12 is level. Bubble level 31 may also be observed to insure that the conduit is level in the orthogonal plane. The operator then begins to bend the conduit so that the end of the conduit 23 moves upwardly in the plane indicated by bubble level 30. As the bend is formed, the operator observes bubble level 30 and insures that the bubble remains between the indicators in the bubble level. The angle of the bend is read on angle indicator 32. When the desired degree of the first bend has been achieved, the operator may then move the conduit forward in the bending apparatus in preparation for any subsequent bends. The plane indicator is kept affixed to the end of the conduit and is not disturbed.

Upon replacement of the conduit in the conduit bending device for a subsequent bend, the conduit is axially rotated in the bending device until bubble level 30 provides an indication that the length of base member 12 is level. The operator may also adjust the conduit so that it is level in the orthogonal plane by observing bubble level 31. The additional bend is made in a fashion similar to the first bend, with the operator observing the level in bubble level 30 to insure that the bubble remains within the marks in the bubble level. When the desired degree of the subsequent bend has been achieved, as indicated on angle indicator 32, all resultant subsequent bends should be coplanar with the first bend.

FIG. 4 shows a U-shaped or "saddle" bend commonly employed where a continuous section of conduit is desired for an application involving the avoidance of an obstacle in the path of the conduit. Four angular bends in the conduit are evident, with the ends of the conduit being substantially coaxial after the bends are made.

FIG. 5 is an end view of the saddle bend shown in FIG. 4 wherein the conduit bending plane indicator of the present invention was successfully employed. It will be observed that the bends in the conduit lie coplanar. In contrast, FIG. 6 shows an end view of a saddle bend wherein the present invention was not used. As is evident, an angular offset or "dog leg" exists in the saddle bend when viewed from the end. Although it may be possible to have the ends of the conduit essentially coaxial, the dog leg prevents the bent portion of the conduit from lying flat against a surface to which the conduit is mounted. Those skilled in the art will appreciate that the use of the present invention in a conventional conduit bending device will prevent dog legs such as the one shown in FIG. 6.

FIG. 7 shows the conduit bending plane indicator of FIG. 1 with the angle indicator 32 removed to show the female snap member 36. Base member 12 is partially cut away to show the male snap member 35 on the lower side 14. A male snap member 37 is attached to the upper side 13 of the base member, and the similar male snap member 35 is attached to the lower side 14 of the base member. The mating female snap member 36 is embedded in mounting member 33 flush with the base thereof so as to receive a male snap member while allowing the mounting member to lie flat on the base member. It will be understood that angle indicator 32 may be removed from the male snap member 37 on the upper side of the base member, and then displaced along line 40 and attached to male snap member 35 on the lower side of the base member.

FIG. 8 is a partial sectional view of mounting member 33 which clearly shows how female snap member 36 receives male snap member 37 when the angle indicator is mounted to the upper side of the base member.

FIG. 9 is a second embodiment 10' of the present invention wherein angle indicator 32' is mounted via mounting member 33 and suitable attachment means to a circular base member 12' having an upper side 13' and a lower side 14'. As in the case of the apparatus of FIGS. 1-7, the angle indicator is rotatable and may be attached to either side of the base member. A C-clamp 20' affixes the indicator to a section of conduit 23' with wing bolt 21'. A chain 42 is attached to base member 12' and may be used for carrying the apparatus or for affixing it to the belt of the operator.

In order to use the second embodiment 10', the indicator is attached to the conduit in a fashion similar to that described in connection with FIGS. 1-7. The conduit is then placed in the bending device and adjusted in the conventional manner until the angle indicator indicates 0 degrees and is visibly free-moving. The bend is made in the manner described above, except that the operator uses the angle indicator to indicate both the angle of bend and the plane of bend. Those skilled in the art will appreciate that conventional pendulum clinometer angle indicators tend to bind or snag if tilted away from a vertical plane. Thus, if a bend is formed which deviates from the desired vertical plane of bend, the angle indicator will tend to bind or snag within its housing. Thus, a skilled operator may ensure coplanar bending by making the bends so that the angle indicator moves more freely within its housing.

It will be understood that the foregoing relates only to preferred embodiments of the present invention disclosed herein and that numerous changes and modifications may be made therein without departing from the spirit and scope of the invention as described in the following claims.

We claim:

1. An apparatus for insuring coplanar bends in conduit, comprising:
   a base member;
   fastening means attached to said base member for rigidly fastening said base member to a section of conduit to be bent;
   first plane indicating means attached to said base member for providing an indication that a bend in the conduit is substantially planar in a first plane;
   second plane indicating means attached to said base member for providing an indication that a bend in the conduit is substantially planar in a second plane orthogonal to said first plane;
   gravity sensitive angle indicating means attached to said base member for providing an indication of the angle of a bend in the conduit; and
   detachable attachment means for detachably attaching said angle indicating means to said base member and allowing said angle indicating means to rotate on said base member.

2. The apparatus of claim 1 wherein said base member has an upper side and a lower side, and wherein said angle indicating means is alternatively attachable with said attachment means to said upper side or said lower side of said base member.

3. The apparatus of claim 2 wherein said detachable attachment means comprises:
   a first attachment element associated with said upper side of the base member;
   a second attachment element associated with said lower side of said base member; and
   a third attachment element associated with said angle indicating means and removably engaging either of said first and second attachment elements, so that said angle indicating means is alternatively attachable to either side of said base member.

4. The apparatus of claim 1 wherein said fastening means comprises a releasable clamp for clamping to conduit.

5. The apparatus of claim 4 wherein said clamp comprises a C-clamp having a threaded member for clamping said C-clamp to conduit.

6. The apparatus of claim 1 wherein said first plane indicating means and said second plane indicating means comprise spirit bubble level means.

7. The apparatus of claim 1 wherein said angle indicating means comprises a pendulum clinometer.

8. An apparatus for insuring coplanar bends in conduit, comprising:

a circular base member having an upper side and a lower side;

a C-clamp attached to said base member for clamping said base member to conduit;

a pendulum clinometer pivotally attached to said base member;

detachable, rotatable attachment means for pivotally and detachably attaching said clinometer to said upper side of said base member or alternatively to said lower side of said base member.

9. The apparatus of claim 8 wherein said attachment means comprises snap means.

* * * * *